(12) United States Patent
Chu

(10) Patent No.: US 6,643,653 B1
(45) Date of Patent: Nov. 4, 2003

(54) METHOD AND APPARATUS FOR IDENTIFYING A DATA SEQUENCE RELATED TO A GIVEN DATA SEQUENCE

(75) Inventor: Winson Chu, Alameda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 314 days.

(21) Appl. No.: 09/873,150

(22) Filed: Jun. 1, 2001

(51) Int. Cl.[7] ............................................. G60F 17/30
(52) U.S. Cl. ......................................................... 707/10
(58) Field of Search ........................... 707/2, 3, 4, 102, 707/104.1, 10, 103 R, 203

(56) References Cited

U.S. PATENT DOCUMENTS

| | | | | |
|---|---|---|---|---|
| 5,664,187 A | * | 9/1997 | Burkes et al. ............... | 707/205 |
| 5,765,173 A | * | 6/1998 | Cane et al. .................. | 707/204 |
| 6,163,774 A | * | 12/2000 | Lore et al. ...................... | 707/2 |
| 6,173,313 B1 | * | 1/2001 | Klots et al. .................. | 709/203 |
| 6,298,425 B1 | * | 10/2001 | Whitaker et al. ........... | 711/162 |
| 6,460,026 B1 | * | 10/2002 | Pasumansky ................... | 707/1 |
| 6,556,998 B1 | * | 4/2003 | Mukherjee et al. ........... | 707/10 |

* cited by examiner

*Primary Examiner*—Safet Metjahic
*Assistant Examiner*—Sano Al-Hashemi
(74) *Attorney, Agent, or Firm*—Park, Vaughan & Fleming LLP

(57) ABSTRACT

A method and apparatus for identifying a target data sequence related to a given data sequence, if a related target data sequence exists. Either sequence may be of variable length. Target data sequences are stored in a virtual tree comprising a root, one or more virtual blocks and one or more leaves. Each leaf contains a target data sequence. A cell in the root corresponding to (e.g., having an index matching the value of) the first datum (e.g., a byte, word, character) identifies a virtual block, of variable size, which contains a node corresponding to (e.g., at a position matching the value of) the next datum of the sequence. Each node contains a home block identifier identifying its home virtual block and a next block identifier identifying either another virtual block or a leaf. Virtual blocks may have no empty nodes, and nodes of multiple virtual blocks may be interleaved.

30 Claims, 4 Drawing Sheets

METHOD AND APPARATUS FOR IDENTIFYING A DATA SEQUENCE RELATED TO A GIVEN DATA SEQUENCE

BACKGROUND

This invention relates generally to the fields of computer systems and data processing. More particularly, given a first data sequence, an apparatus and method are provided for identifying and retrieving a second data sequence associated with or related to the first.

In many data processing environments, it is necessary to map a given sequence of data (e.g., text, numbers) to a related sequence or set of data. Thus, a database system may receive a sequence of characters that a user wishes to search for in a help file, within titles or subjects of books, in a glossary, etc. The user's sequence of characters may reflect just one of multiple different sequences that are equivalent.

For example, in the Unicode character set, a composite character may be received as a sequence of base or other characters. Thus, the composite character ǘ may be received as any of the following sequences: (ǘ ), (u,¨,´ ), (u,´,¨ ), (ü,´) or (ú,¨). Upon receipt of a user's sequence, the database system may need to lookup and retrieve another equivalent sequence or, in this example, a composite character that is equivalent to the sequence. The database may be configured to make such translations in order to do searches with a particular form of a sequence of characters. By changing all equivalent sequences to one form, the database can normalize its search procedure. Thus, a Unicode sequence that can be composed to one normalized or composite character may be replaced, for purposes of the user's search, with the composite character.

A sequence given by the user that will be mapped or translated into another (e.g., equivalent) sequence or character may be virtually any length. And, since any permutation of the equivalent sequence may be received, the system must have mappings for each one. Thus, storing mappings for all possible sequences of a given set of data, and all permutations of the sequences, may require a large amount of storage space.

One manner in which such mappings have been stored is as a multilevel index tree, wherein each node of the tree comprises a fixed-size array. Each array element represents one character that may be part of the given sequence, with a pointer to the node that stores the next member(s) of the sequence. The node and element corresponding to the last datum or item of a user's sequence may store or identify the equivalent sequence. Index trees may require an enormous amount of storage space in order to accommodate all possible lengths of given data sequences. For example, the number of array elements in each node may be equal to the number of possible values of each character or item in the given sequence. And, because many of the tree nodes may be less than fully populated, much of the storage space may be wasted.

In another method of storing data mappings and sequences, a hash table is employed. A hash function is applied to a user's given sequence to generate a key. The key serves as an index to a corresponding element of a hash table or array. The array element identifies or lists (e.g., via a linked list or other structure) data sequences that hash to the same key value and, for each such sequence, a corresponding equivalent sequence. To find the appropriate target data sequence in the linked list, each member of the list must be examined. One of them will store the given data sequence and the destination sequence. Although a hash table may be more efficient in terms of the amount of storage space that is required, finding and retrieving a target sequence for a particular given sequence may be relatively slow because each member of a linked list associate with a key value must be examined.

SUMMARY

Thus, in one embodiment of the invention an apparatus and methods are provided for storing and/or retrieving a target data sequence in response to a given data sequence. This embodiment requires a relatively small amount of storage space and thus provides a high speed of operation (e.g., retrieval of the target sequence).

In this embodiment, a key data sequence is received, which may be composed of letters, numbers or other symbols, and an equivalent, translated, normalized or other related target data sequence is retrieved if it exists. For example, in one implementation of this embodiment, a key sequence of multiple Unicode characters is received and a single normalized or composite equivalent character is retrieved. A single target data sequence may be identified and retrieved for any number of different given data sequences.

In an embodiment of the invention, the data structure used to store and retrieve target sequences may be considered a virtual tree. Illustratively, the virtual tree starts at a root, the size of which (e.g., number of cells) may be equivalent to the possible values of the first datum, item or other unit of the given data sequence (e.g., character, byte, word, symbol). The virtual tree also includes virtual blocks of variable sizes (i.e., comprising a variable number of nodes), and leaves that are also of variable sizes and which contain target data sequences of variable lengths. The virtual tree is traversed for a given or key data sequence by first locating a root cell that corresponds to the first unit within the key sequence. That cell will identify (e.g., by memory address or offset) the virtual block that contains a node corresponding to the next unit. That node will also store a memory offset or pointer to the next virtual block having a node corresponding to the next item, and so on. The node corresponding to the final item of the key sequence identifies the leaf node that contains the target data sequence.

In one embodiment of the invention the virtual blocks of a virtual tree are compressed, in that they contain few, if any, empty nodes, and may overlap. Thus, the nodes of one virtual block may be interleaved (i.e., in memory or storage) with nodes of another virtual block. Therefore, in this embodiment, each node of a virtual block includes a home block field that identifies the address or offset of the node's virtual block. If, while traversing the tree, a node is reached that has a home block field that does not match the address or offset through which the node was accessed (i.e., the node's home block), then the traversal may be terminated because this condition may be interpreted as indicating that the key data sequence has no corresponding target data sequence. Nodes may also include the address or offset of the next virtual block (or leaf) to be visited in the traversal or lookup process. In one embodiment, an address or offset of zero indicates that tree traversal should be terminated because the given key sequence does not map to a target sequence.

In another embodiment of the invention, a leaf contains target data sequence and, possibly, the length of the contained sequence (e.g., especially if target sequences are variable in length). Also, a leaf may contain a pointer or other reference (e.g., an address or offset) to another virtual block if there is another key data sequence that is longer than, and which starts with the present key data sequence.

DETAILED DESCRIPTION

Figure 1:
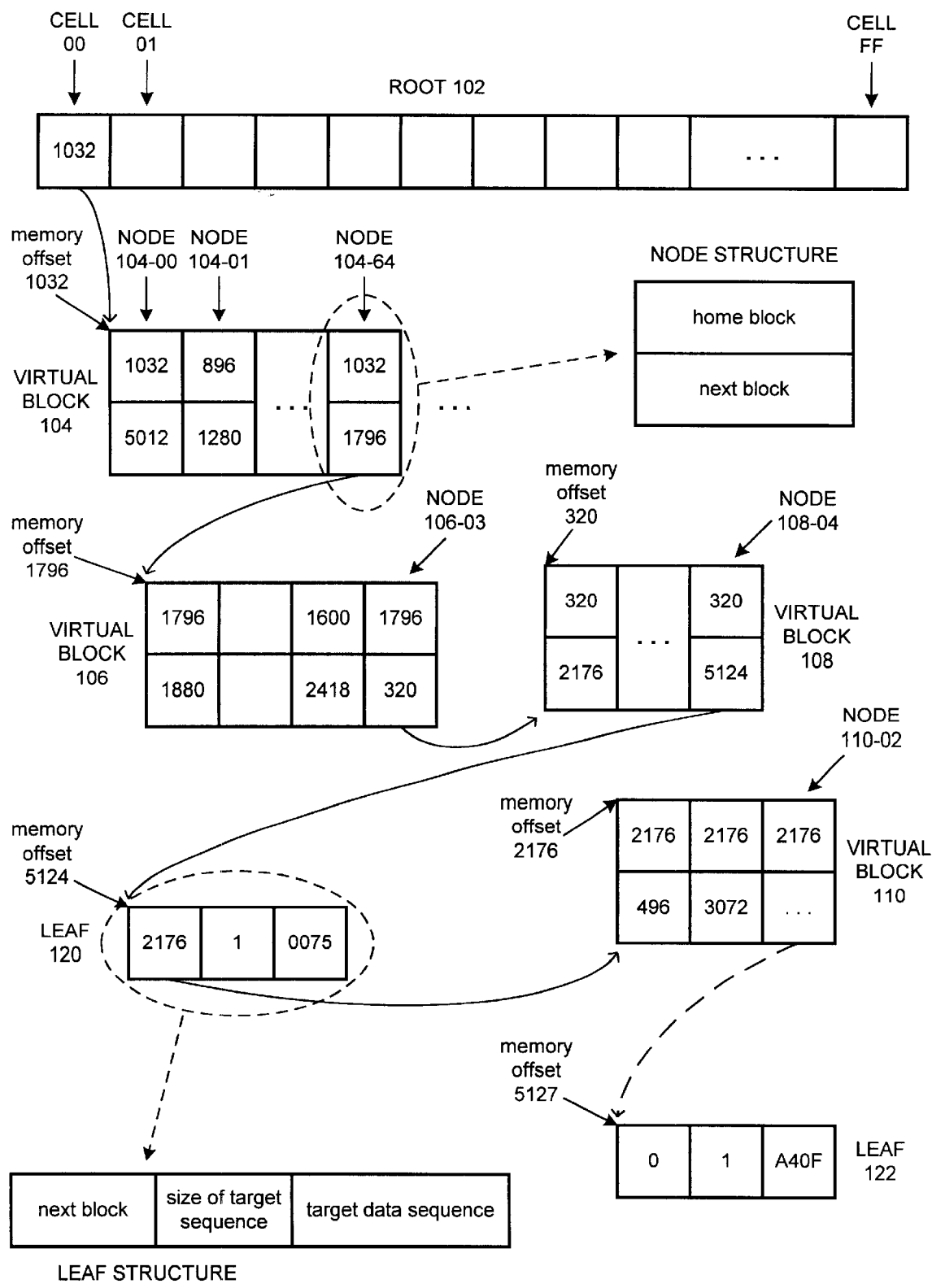
FIG. 1 is a block diagram depicting a virtual tree for retrieving a target data sequence related to a given key sequence, according to one embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network or a publicly accessible network such as the Internet.

In one embodiment of the invention, an apparatus and methods are provided for retrieving a target sequence of data related to a given, or key, sequence of data. The key and target data sequences may be comprised of characters, numerical values (e.g., data from a database), codes, symbols, signals, and so on, and may use any character set that can be represented electronically (e.g., Unicode, ASCII).

In one implementation of this embodiment, the data sequences comprise sequences of Unicode characters (e.g., from the version 3.0 character set). Thus, each character in this implementation is two bytes in size and the set comprises approximately 64K possible characters. In this implementation, when a key sequence —which may be of any length (i.e., one or more characters) —is presented, it is mapped to a single composite or normalized Unicode character. The composite character may be considered equivalent to the combination of the key characters. Thus, this embodiment of the invention facilitates the process of character composition, in which a sequence of Unicode characters is received and used to locate and retrieve an equivalent composite or normalized character. This may be done in order to treat all equivalent character sequences (e.g., all sequences that can be composed to the same character) similarly. The retrieved equivalent character may be used in place of the received sequence (e.g., for a database lookup, for data entry or for other purposes). In other implementations, both key and target sequences may be of virtually any size.

In other embodiments of the invention, a given codeword may be mapped to a sequence of plaintext (or vice versa), a character, word or phrase in one language may be mapped to an equivalent character, word or phrase in a different language, a given address may be mapped to a corresponding set of information (e.g., postal code, area code, telephone number), etc. In one particular alternative embodiment, a user's given sequence of characters (e.g., a file identifier) may be mapped to a physical address of a file. Another alternative embodiment may be used to build index trees for sets of data (e.g., databases).

Advantageously, the target data sequences are stored in a manner that makes efficient use of memory or other storage (e.g., disk space), and which also promotes rapid retrieval of a desired sequence. Thus, an embodiment of the invention provides the retrieval speed often associated with multilevel index trees, but uses much less storage space, and offers the efficient data storage of a hash table, but with faster access.

In one embodiment of the invention, the memory or storage space in which target sequences (and mappings to the target sequences) are stored is a virtual tree and is traversed step by step according to each datum (e.g., character, symbol, word (i.e., two byte word)) or convenient portion of a datum (e.g., byte) of a given or key data sequence. Thus, if the key sequence is a sequence of Unicode characters, with each character comprising two bytes, the data lookup or retrieval process may be done in steps according to each byte or, alternatively, each character. Each step in the traversal process may involve locating a cell, node or other entry corresponding to the current byte and retrieving a pointer or offset to the node or memory area containing an entry corresponding to the next byte. The entry corresponding to the last byte of the given sequence will then identify or include the target data sequence. A verification process applied as each cell, node or other entity is mapped to a subsequent entity ensures that only key sequences that have related target sequences are mapped. Key sequences that fail the verification process are deemed to have no target sequences.

More particularly, in this embodiment a root of the virtual tree comprises one cell for each possible value of the first datum (i.e., character) or portion of a datum (i.e., byte). Thus, a particular cell of the root is easily located from the first datum. In that cell is stored an offset, address, pointer or other reference to a first virtual block containing a node corresponding to the second datum or datum portion. The minimum size of a virtual block is one node; its maximum size is equivalent to the number of possible values of a datum or datum portion. At the ail first virtual block, the value of the second datum (or datum portion) is used as an index or offset to locate the node containing an address, offset or other reference to the next virtual block; and so on, until a node of a final virtual block identifies the leaf node containing the target sequence.

FIG. 1 demonstrates one representation or illustration of the storage of target data sequences, according to a present embodiment of the invention. This embodiment is configured for retrieval of normalized or composite Unicode characters in response to Unicode character sequences of variable sizes. In particular, from a given or key sequence of any length, a composite or normalized equivalent Unicode character is located, if there is one. However, other embodiments of the invention may be readily developed for other data types and sequences, based on the following description and corresponding figures.

The hierarchical structure illustrated in FIG. 1 may be considered a virtual tree comprising root 102, virtual blocks 104, 106, 108, 110, and leaves 120, 122. Depending on the number of target data sequences that are stored, a virtual tree may include any number (one or more) of virtual blocks and leaves, and is not limited to the structure (e.g., number of virtual blocks, root cells, leaves) of FIG. 1. The "virtual" nature of the tree lies in the variably sized blocks and leaves, and in the possibility of overlapping virtual blocks, as will be better understood from the following discussion. The virtual tree is described as it may be traversed to map a key data sequence of "0x00 0x64, 0x03 0x04," representing a sequence of two Unicode characters, to locate an equivalent normalized character.

In the illustrated embodiment, root 102 comprises 256 cells, corresponding to the 256 possible values of the first byte of the key sequence. The cells may be identified or numbered in hexadecimal notation as 0x00, 0x01, . . . , 0xFF. Illustratively, each cell is two bytes in length, and is configured to store an offset, address, pointer, or other means of identifying the location or starting memory or storage address of a virtual block. More particularly, in this embodiment the cell corresponding to the first byte of a given sequence stores the offset, within the memory area in which the virtual tree is stored, of the virtual block corresponding to the next byte of the given sequence. Although the key sequence is parsed byte by byte in this embodiment, in other embodiments a key sequence may be parsed in increments of other sizes (e.g., words, half-bytes).

In FIG. 1, if the Unicode character sequence to be "composed" or "normalized" (i.e., the key sequence for which a composite or normalized character is to be retrieved) is represented in hexadecimal notation as "0x00 0x64, 0x03 0x04," then the cell of root 102 corresponding to 0x00 (the value of the first byte) stores the memory offset or address of the virtual block corresponding to 0x64, the value of the second byte of the first character. In this example, that offset is 1032, which marks the beginning of the virtual block 104. In similar fashion, a node in that virtual block will identify or point to the virtual block corresponding to the next byte of the next character (i.e., 0x03), and so on. Thus, the node corresponding to the second byte of the key sequence (i.e., 0x64) is located at position 64 in virtual block 104, and may be identified as node 104-64. Just as the first byte of the key sequence was used as an index to locate a cell within the root, successive byte values are used as offsets or indexes within virtual blocks to find the nodes that identify subsequent virtual blocks. A node within a virtual block corresponding to the final byte will identify a leaf that stores the target data sequence.

Virtual blocks do not have pre-determined sizes; each may include one or more nodes. In the illustrated embodiment for Unicode character sequences, in which each node corresponds to one byte of a character, each virtual block may have up to 256 nodes. Thus, the maximum size of a virtual block may depend on the size of the datum or datum portion (e.g., one byte or two bytes) used to traverse the virtual tree. As just described, the nodes within a virtual block may be visualized or identified according to their position or index in the virtual block, starting with zero. Thus, virtual block 104 includes nodes 104-00, 104-01 and 104-64, among others.

As shown in FIG. 1, in this embodiment of the invention each node of a virtual block comprises two values, a "home block" and a "next block." The home block value identifies or verifies the node's proper home virtual block (e.g., by memory offset or address). The next block value identifies the memory offset or address of the virtual block corresponding to the next byte or position in the key data sequence. Illustratively, the home block and next block values may each be two bytes (i.e., one word) in length, thereby making each node four bytes in size and the maximum node size 1 Kbyte, in this embodiment.

As long as the home block of each node visited while mapping a key sequence matches the offset or address of the virtual block through which the node was reached, the mapping process continues. Thus, accessing node 104-64 indicates that there is at least one target data sequence that matches a key sequence beginning with "0x00 0x64"(i.e., because the home block value of 1032 matches the starting address/offset of virtual block 104), and so the mapping or translation process should continue. Conversely, if the key sequence started with "0x00 0x01," the mapping would have led to node 104-01 and, because the home block of node 104-01 does not match the offset or address of virtual block 104, it may be determined that there are no target data sequences (i.e., normalized or composite Unicode characters) for key sequences starting with "0x00 0x01"Virtual block 104 demonstrates that virtual blocks may overlap such that their component nodes may be interleaved. Node 104-01 in FIG. 1 may thus be more properly visualized as node XXX-34 of virtual block XXX (not depicted in FIG. 1), which has a starting memory offset or address of 896.

The virtual tree of FIG. 1 may thus be traversed as follows. Cell 0x00 of root 102 corresponds to the first byte or half-character (i.e., 0x00) in the key sequence "0x00 0x64, 0x03 0x04," and stores the memory offset or address of the first virtual block to be visited (i.e., virtual block 104). Within virtual block 104, the next byte of the sequence (i.e., 0x64) maps to node 104-64. The home block of 104-64 matches the offset of virtual block 104 (i.e., 1032), thus indicating that the mapping process should continue. The next block value of node 104-64 is therefore retrieved (i.e., 1796) and used to locate the next virtual block, block 106.

The next byte of the key sequence (i.e., 0x03) maps to node 106-03. The home block of node 106-03 matches the offset of virtual block 106 (i.e., 1796), and so the memory offset 320 is retrieved from the node's next block field. Offset 320 marks the start of virtual block 108, and the final byte in the key sequence (i.e., 0x04) maps to node 108-04. Because the home block of node 108-04 matches the offset of virtual block 108, the next block field of the node is examined.

The next block field of node 108-04 (i.e., 5124) identifies a leaf, as can be determined by the magnitude of the offset.

Illustratively, in the embodiment of FIG. 1, offsets or addresses at or above the threshold value of 5000 correspond to leaves, while values below 5000 correspond to virtual blocks. In this embodiment of the invention, when the target sequences and mappings are stored in memory the mappings (i.e., the root and virtual blocks) are stored together, followed by the leaves. The threshold offset at which the leaves begin may then be noted.

The structure of a leaf is depicted in FIG. 1. In this embodiment a leaf comprises a next field that stores the offset of either the leaf itself or another virtual block, a size field identifying the size of the target data sequence (e.g., in bytes, two-byte words or other increments), and the target data sequence itself.

When leaf 120 is accessed from virtual block 108, the next field is examined. If it is zero, then the mapping process will terminate at the leaf and the target data sequence may be retrieved from the leaf. However, if, as in FIG. 1, the next offset is not zero and instead identifies another virtual block, this indicates that there is at least one key sequence that is longer than the present key sequence, but which starts with the same characters. More particularly, if the given key sequence "0x00 0x64, 0x03 0x04" matches the beginning of any longer key sequences that can be composed to form a normalized Unicode character, then the next offset field will identify the virtual block corresponding to the next byte of the sequence. Thus, in FIG. 1, the next field of leaf 120 identifies virtual block 110, starting at offset 2176. If we had not yet reached the last byte of our key sequence, we would continue at virtual block 110. Leaf 122, at offset 5127, would eventually be reached (e.g., through one or more virtual blocks).

However, in the present example the key sequence has been fully mapped when leaf 120 is reached (i.e., we have used the last byte of the last character of the key sequence). Therefore, even though there are longer key sequences that begin with the present key sequence (i.e., the next field identifies a virtual block), this example is completed by noting the size of the target sequence and retrieving it. In this embodiment of the invention, a value of zero in a next block field of a leaf indicates that no longer key sequences exist that start with the key sequence that led to the leaf. Conversely, a value other than zero in a home block will be the address or offset of another virtual block.

In one alternative embodiment of the invention, instead of storing a zero in a leafs next block field when no further mapping is possible, the address or offset of the leaf itself, or some other value, may be stored in the next block field.

In the illustrated embodiment, the key Unicode character sequence is mapped to a single composite or normalized character, and so the target sequence is a single Unicode character. In other embodiments of the invention, however, a target sequence may be of virtually any length, and the size field will ensure that the target sequence is retrieved properly.

In the illustrated embodiment of the invention, each field of the virtual tree —the cells of root 102, the home block and-next block fields of a virtual block, the fields of a leaf—may be of the same size (e.g., two bytes) or different sizes. Also, because the collection of target data sequences in this embodiment, and the mappings to the target sequences, are relatively static, the virtual tree may be stored contiguously in memory.

Figure 2:
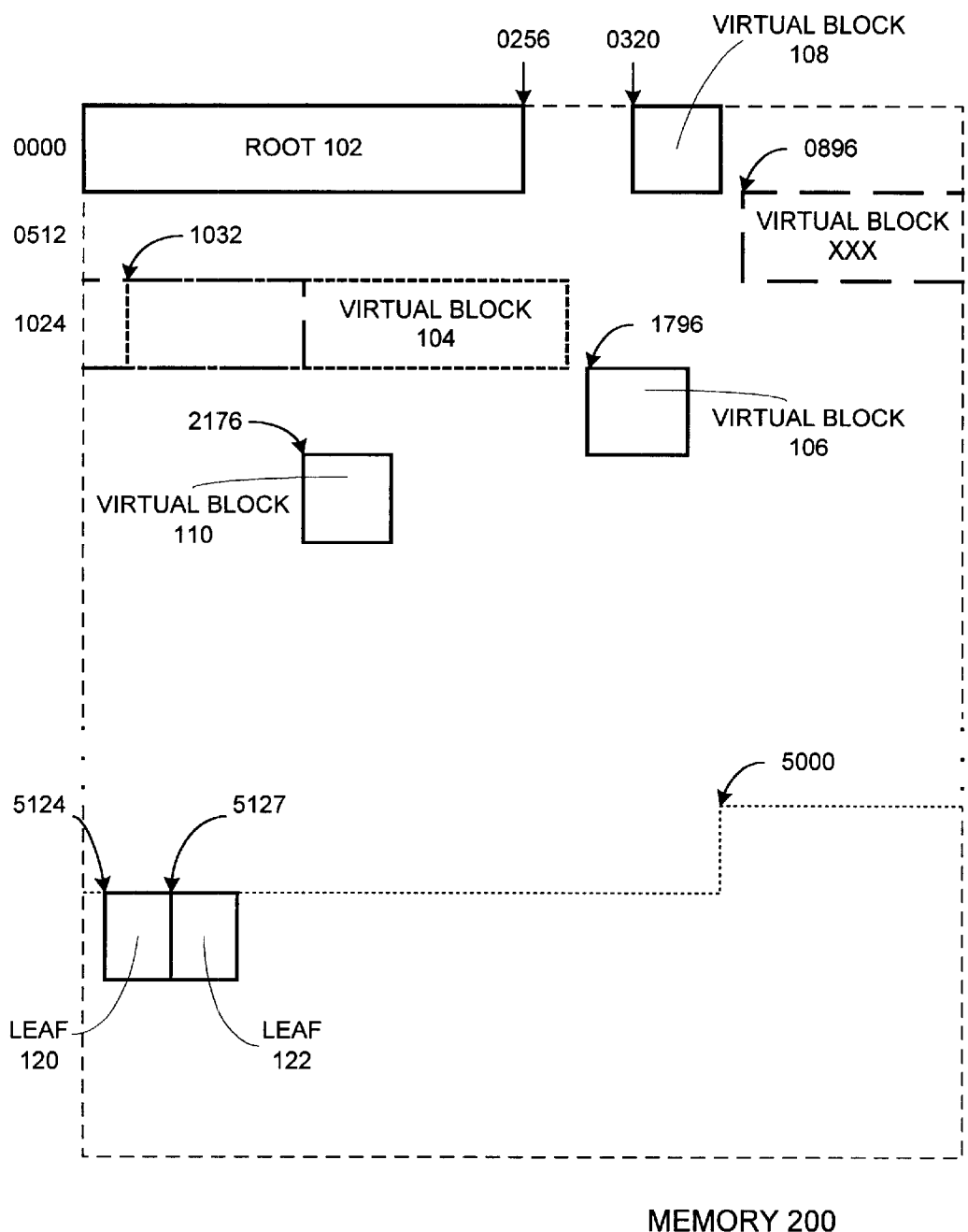
FIG. 2 depicts a contiguous section of memory or other storage for storing a virtual tree according to FIG. 1, in accordance with an embodiment of the invention.

FIG. 2 depicts the storage of a virtual tree, such as that of FIG. 1, according to one embodiment of the invention. In this example, the target data sequences to be retrieved, and the root and virtual blocks that facilitate their retrieval, are static. Therefore, memory 200 is one contiguous portion of memory (e.g., ROM, RAM) or other storage (e.g., disk) with little or no unused space. FIG. 2 demonstrates the manner in which virtual blocks may overlap or interleave.

It should be apparent that the amount of memory or storage space required for storing a virtual tree in this embodiment may be much less than would be required in a typical multilevel index tree where each array or multi-node element may be of fixed size and include a significant number of empty or unused elements.

In FIG. 2, root 102 is stored at the beginning of memory 200. The memory after root 102 and up to memory offset or address 5000 is filled with virtual blocks of various sizes. After offset 5000 are leaves containing target data sequences. In this example, it can be seen that virtual block XXX (marked with a boundary of long dashes) and virtual block 104 (marked with a boundary of shorter dashes) overlap. The amount of overlap depends upon the actual size of each virtual block. Both are depicted in FIG. 2 as being less than their maximum possible sizes for the embodiment of the invention described in conjunction with FIG. 1 (i.e., 256 nodes, at four bytes per node, equals 1024 bytes). Virtual blocks 106, 108 and 110 are also depicted at their respective offsets. Leaves 120, 122 are stored contiguously.

Figure 3:
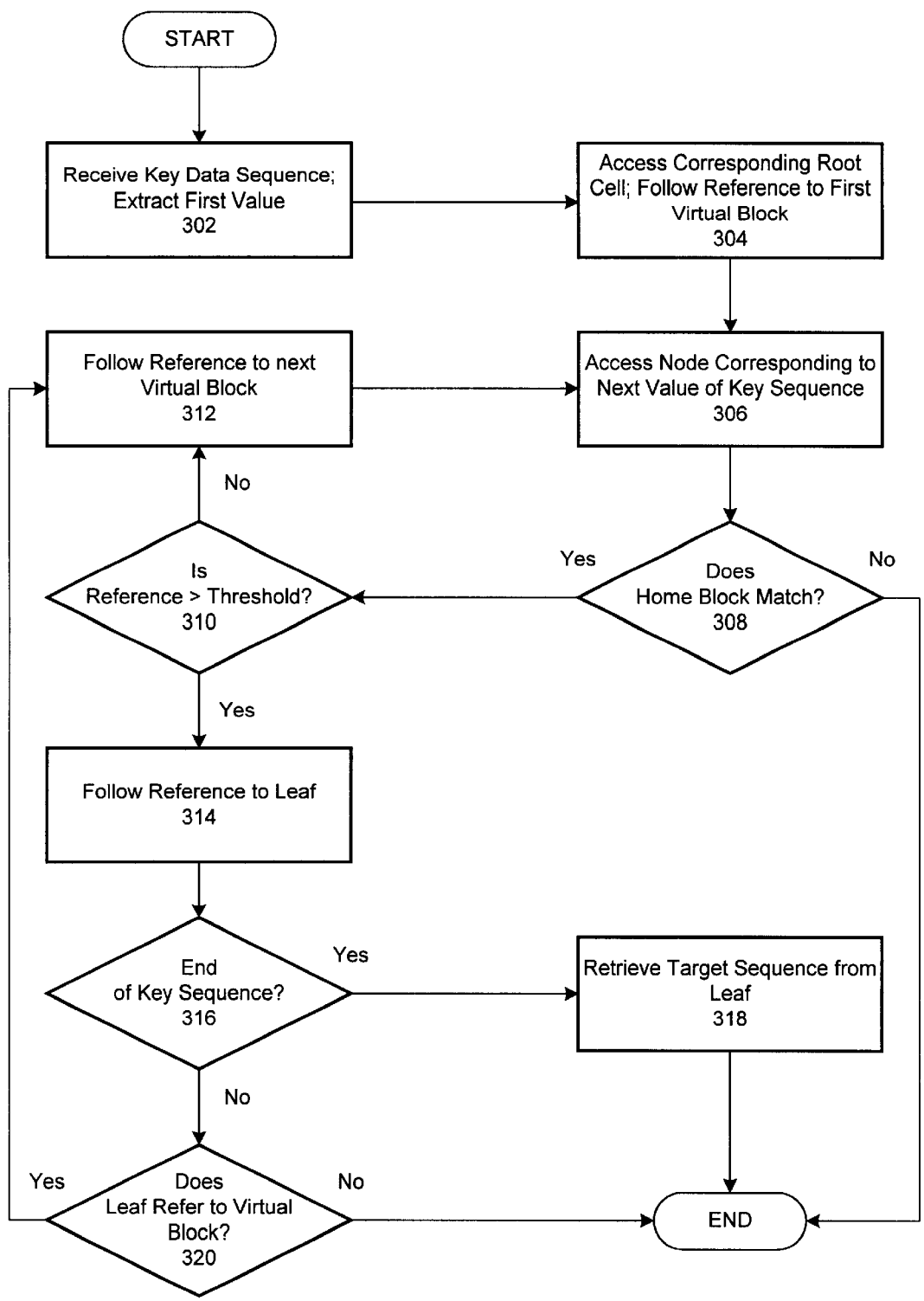
FIG. 3 is a flowchart illustrating one method of mapping a key data sequence to a target data sequence in accordance with an embodiment of the invention.

FIG. 3 demonstrates one method of retrieving a target data sequence in response to a key data sequence, according to one embodiment of the invention. This embodiment of the invention may be configured to handle data sequences of one type (e.g., sequences of Unicode characters) or multiple types, and the key and target data sequences may be of any lengths.

In state 302, a key data sequence is received and a first value is extracted from the sequence. Illustratively, the first value comprises the first byte, word (i.e., two bytes) or other unit of data. The first value may therefore comprise all or a portion of the first character, number, symbol or other datum of the key data sequence. The extracted value may be in any suitable notation (e.g., decimal, hexadecimal, binary) or may be converted to a suitable notation.

In state 304 the first value is used as an index into an entry block or root. Illustratively, the entry block has one cell for each possible numerical quantity that the first value may have. From that cell, an offset, address, pointer or other reference to a virtual block or set of nodes is retrieved and followed. The referenced virtual block may comprise as few as one node or as many nodes as the maximum quantity that the next value of the key sequence may represent.

In state 306 the next (i.e., second) value of the key sequence is used as an index into the virtual block to identify a particular node.

In state 308 a home block field of the node is compared to the offset or address of the present virtual block. If they match, then the mapping process can continue, at state 310, because there may be a target sequence corresponding to the key sequence. Otherwise, if the home block does not match, it may be determined that no target sequence exists for this key sequence and the process ends.

In state 310, a next block field of the node is examined. Illustratively, if the offset or address of the next block is greater than a threshold or predetermined value (i.e., a memory threshold dividing virtual blocks from leaves), then the illustrated process advances to state 314. Otherwise, the process continues at state 312. In one alternative embodiment of the invention, if, in state 310, it is determined that the final value of the key data sequence has been used, and yet the present node refers to another virtual block (i.e., not a leaf), then it may be assumed that no target sequence exists for this key sequence, and the process may end.

In state 312, the node's next block reference is followed to access the specified virtual block. The illustrated process then returns to state 306.

In state 314, the node's next block reference is followed to the corresponding leaf.

Then, in state 316, the method determines whether the last value of the key data sequence has been used (i.e., for the node that was just visited). If not, then the process advances to state 320.

Otherwise, in state 318, the key data sequence has been completely mapped, and so the target data sequence is retrieved from the current leaf and the process ends. A size field may be examined to determine the length of the target sequence.

In state 320, the key data sequence has not been completely mapped. Therefore, the leaf is examined to determine if it points to or otherwise refers to another virtual block (e.g., at an offset or address below the threshold). If so, then that the process returns to state 312 to access that virtual block and continue the mapping process. Otherwise, if the key data sequence has not been completely mapped, and yet there are no more virtual blocks for the sequence, then the process ends.

In one alternative embodiment, the cell of the entry block or root that the first value maps to may lead directly to a leaf. In another alternative embodiment of the invention, the size (e.g., number of bytes) of a value taken from a key data sequence during traversal of a virtual tree may vary depending on whether the value is being used an index into a root, a virtual block or other structure. In yet other alternative embodiments of the invention, means other than a threshold memory offset or address may be used to differentiate leaves from virtual blocks. For example, virtual blocks, nodes and/or leaves may comprise flags or other indicators to indicate their form or status.

The amount of space (e.g., memory or disk) needed to store target data sequences (i.e., leaves) and mapping information (i.e., virtual blocks and the root) may depend on the number and lengths of the target sequences. Illustratively, however, efficient use of memory or disk storage is promoted by generating virtual blocks with as few empty nodes as possible, and by storing the target sequences and mapping information contiguously. Thus, little or no unused space may remain in the allocated storage space. In alternative embodiments, however, some free space may remain (e.g., in order to add new target data sequences).

Figure 4:
FIG. 4 illustrates several key data sequences that may be mapped to target key sequences in an embodiment of the invention.

FIG. 4, lists a number of key data sequences that may be mapped to corresponding target data sequences in an embodiment of the invention. Each line contains one key sequence, the members of which are separated by colons. The minimum length of a sequence in FIG. 4 is one 4-digit hexadecimal number; the maximum is four 4-digit hexadecimal numbers. Illustratively, each 4-digit hexadecimal value represents a Unicode character.

In one embodiment of the invention, the amount of storage space needed to store a set of target data sequences corresponding to the key data sequences of FIG. 4, and the virtual blocks and root for mapping a key data sequence to a target data sequence may be determined as follows. The total storage space needed will equal the amount of space needed to store the root plus the space needed to store all of the virtual blocks, plus the amount of space needed to store the leaves.

In this embodiment, the virtual tree is configured to map a key data sequence to a target data sequence by applying two consecutive digits of each 4-digit hexadecimal number in the sequence at a time. For example, the first key data sequence would be mapped using 0x00, then 0x20, then 0x06 and finally 0x4E. Therefore, the root may be configured with one cell for each possible value that two digits of a 4-digit hexadecimal number may take. This would require 256 (in decimal notation) cells—for each value from 0x00 through 0xFF. Alternatively, the number of root cells may be limited to the number needed for the given set of key data sequences. Thus, in FIG. 4, where the maximum first value (i.e., maximum value of the first half of a first 4-digit hexadecimal number) is 0x03, only four root cells are needed (i.e., for 0x00 through 0x03). The overall size of the root is thus determined by the number of cells multiplied by the size of each cell, where each cell contains the memory offset or address to a virtual block or leaf. In this discussion, it will be assumed that all memory offset/address fields (i.e., whether they are root cells, home or next block fields in a virtual block or a home field of a leaf) are of the same size.

Next, the amount of storage space for the virtual blocks may be determined. In this embodiment, key data sequences having matching values will continually map to the same virtual blocks, until their sequences diverge. For example, the first two sequences (sequences 402, 404) will map to the same virtual blocks (and virtual block nodes), until their fourth values 402d, 404d (i.e., the last half of the second 4-digit hexadecimal number), where one value is 0x4E and the other is 0x4F.

Therefore, in this embodiment a separate virtual block is needed for each unique sub-sequence. In other words, one virtual block is needed for each unique first value (i.e., first two digits of the first 4-digit hexadecimal number), another virtual block is needed for each unique sequence or sub-sequence that is two values long, another virtual block is needed for each unique sub-sequence of three values, and so on, with one caveat. A virtual block is not needed for a unique sequence or sub-sequence that ends at the current length.

For example, among the key data sequences of FIG. 4, the only unique values for the first position (i.e., the (a) position) are 0x00, 0x01, 0x02 and 0x03. Therefore, only four virtual blocks are required for the first position. For each unique sequence that continues beyond two values (e.g., 404, but not 406), another virtual block will be needed; these unique sub-sequences are: 0x0020, 0x0021, 0x0028, 0x017F, 0x01B7 and 0x0292. Therefore, six virtual blocks are needed for unique sub-sequences longer than two values. Because none of the continuing sequences end after the third value (the (c) position), seven additional virtual blocks are needed for unique sub-sequences that are three values long: 0x002006, 0x002030, 0x002800, 0x017F03, 0x01B703 and 0x029203. Similarly, ten additional virtual blocks are needed at the fourth position (d) for the ten unique sub-sequences that extend beyond four values. This is repeated for each succeeding position through the end of the longest sequence. Thus, the total number of required virtual blocks is determined.

Key data sequences that end before others, such as sequences 402 and 406, will map to leaves (i.e., the nodes in the virtual block that correspond to the final value in the ending sequences will store addresses/offsets of leaves). Note, however, that some longer key sequences may continue where a shorter, matching sequence ends. For example, sequence 410 matches sequence 408 through the end of sequence 408, but then continues. Thus, key sequences that begin with the pattern of sequence 408 (i.e., 0x0020), such as 410, may map to a leaf that has a next block field that identifies a virtual block for mapping the remainder of the sequences.

For each virtual block needed (as identified above), the number of nodes in the block can be determined by subtracting the smallest value that must be mapped into the block (i.e., from the following position in the key data sequences) from the largest subsequent value, and adding one. Thus, in the initial virtual block for key data sequences starting with 0x00, the highest value to map into that block (from position (b)) is 0x28, while the lowest is 0x20. Thus, the number of nodes in this virtual block is 0x08 plus one, or nine. Similarly, for the initial virtual block for key data sequences starting with 0x01, the highest value of the next byte (i.e., next two hexadecimal digits) is 0xB7 while the lowest value is 0x7F, thereby requiring 0xB7−0x7F+1, or 57 (decimal) nodes. For the initial virtual block corresponding to the first value 0x02, 51 nodes are needed (i.e., 0x95 −0x63+1), and the initial virtual block corresponding to the unique one-value sequence 0x03 will be populated with only one node (i.e., 0x00−0x00+1).

Similarly, the number of nodes for each virtual block corresponding to unique and non-terminating two-value sequences may be calculated. For example, for the unique two-value sub-sequence 0x0020, the corresponding virtual block will have 43 nodes (i.e., 0x30−0x06+1). Each of the virtual blocks corresponding to the other unique two-value sub-sequences will have only one node.

This process is repeated for each virtual block. The total storage space needed for the virtual blocks is thus equal to the aggregate space needed for each individual block, which is determined by the multiplying the number of nodes in each block by the size of each node (e.g., the aggregate size of the home and next block fields). Note that the total storage space needed for the virtual blocks, plus the space needed for the root, may be used to identify the threshold memory address/offset dividing virtual blocks from leaves.

Next, the total space needed for leaves to store the target data sequences is determined. The number of target data sequences is known, and each may be stored in a single leaf, therefore, there will be one leaf for each target sequence in this embodiment. The size of each leaf may vary, depending on the length of the target data sequence, the size of each datum (e.g., character, symbol) in the sequence, the size of the field that indicates the length of the sequence and the size of the "next" field.

In the embodiment described above in conjunction with FIG. 4, the virtual blocks are stored contiguously, but are not compacted or interleaved. In one alternative embodiment of the invention, virtual blocks are interleaved, in which case an empty or unpopulated node of a first virtual block may be replaced or overlaid by a non-empty node of a second virtual block. This alternative embodiment allows the virtual tree to be stored in even less space.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the following claims.

What is claimed is:

1. A method of mapping a key sequence of data to a target sequence of data, if the target sequence is stored in a computer readable memory, the method comprising:

retrieving, from a root node of the computer readable memory corresponding to the value of a first datum in said key sequence, an identifier of a first block;

for one or more blocks starting with said first block, wherein each of said blocks is one of a virtual block comprising one or more nodes and a leaf configured to store a sequence of data:

determining whether said block is a virtual block or a leaf;

if said block is a virtual block:

locating a node in said virtual block corresponding to the value of a next datum in said key sequence;

retrieving a home block identifier from said node; and if said home block identifier identifies said virtual block, accessing a next block identified by a next block identifier of said node; and if said block is a leaf:

determining whether said leaf contains said target sequence of data;

if said leaf contains said target sequence of data, retrieving said target sequence;

if said leaf does not contain said target sequence, accessing a next block identified by a next block identifier of said leaf if said leaf contains a next block identifier.

2. The method of claim 1, wherein said determining whether said leaf contains said target sequence of data comprises:

determining whether virtual block nodes corresponding to each datum of said key sequence have been accessed;

wherein if virtual block nodes corresponding to each datum of said key sequence have been accessed, then said leaf contains said target sequence of data.

3. The method of claim 1, wherein said determining whether said block is a virtual block or a leaf comprises:

determining whether an identifier by which said block is accessed identifies a block greater than or less than a threshold location in the computer readable memory.

4. The method of claim 3, wherein said identifier by which said block is accessed is one of:

said identifier of said first block if said block is said first block; and said next block identifier is said block is a block other than said first block.

5. The method of claim 1, wherein said retrieving an identifier of a first block comprises:

accessing a root block of the computer readable memory; and using said value of the first datum as an offset to identify said root node of said root block.

6. The method of claim 1, wherein nodes of two or more of said virtual blocks are interleaved in the computer readable memory.

7. The method of claim 1, wherein virtual blocks and said leaves are stored contiguously in the computer readable memory.

8. The method of claim 1, wherein said key sequence of data comprises a series of Unicode characters.

9. The method of claim 1, wherein said target sequence of data comprises a normalized Unicode character corresponding to said series of Unicode characters.

10. A computer-implemented method of facilitating retrieval of a target data sequence related to a key data sequence, comprising:

(a) receiving a key data sequence comprising a sequence of data;

(b) for a first datum in said key data sequence, locating a corresponding cell in a root block;

(c) retrieving from said cell an identifier of a virtual block comprising one or more nodes;

(d) locating a node in said virtual block corresponding to a next datum in said key data sequence;

(e) retrieving from said node an identifier of a next block, wherein said next block is one of another virtual block and a leaf;

(f) repeating (d)–(f) until said next block is a leaf; and (g) if said node from which said identifier of said leaf was retrieved corresponds to the last datum in said key data sequence, retrieving said target data sequence from said leaf.

11. The computer-implemented method of claim 10, further comprising if said node from which said identifier of said leaf was retrieved does not correspond to said last datum in said key data sequence:

(h) retrieving from said leaf an identifier of a next virtual block; and (i) repeating (d)–(g).

12. The method of claim 10, wherein said locating a corresponding cell comprises using the value of said first datum as an offset in said root block.

13. The method of claim 10, wherein said locating a node comprises using the value of said next datum as an offset into said virtual block.

14. The method of claim 10, wherein said locating a node comprises comparing a home block identifier within said node to said identifier of said virtual block.

15. The method of claim 14, wherein said locating a node further comprises terminating the method if said home block identifier does not match said identifier of said virtual block.

16. The method of claim 10, wherein said retrieving from said node an identifier of one of a next virtual block and a leaf comprises:

retrieving said identifier; and comparing said identifier to a threshold;

wherein said threshold identifies a memory location separating virtual blocks from leaves.

17. The method of claim 10, wherein said key data sequence is a first series of Unicode characters and said target data sequence is a second series of Unicode characters.

18. The method of claim 17, wherein said first series comprises multiple Unicode characters and said second series comprises a single Unicode character.

19. The method of claim 10, wherein said (f) comprises determining whether said identifier of a next block identifies a block above or below a threshold storage location.

20. A computer readable storage medium storing instructions that, when executed by a computer, cause the computer to perform a method of facilitating retrieval of a target data sequence related to a key data sequence, the method comprising:

(a) receiving a key data sequence comprising a sequence of data;

(b) for a first datum in said key data sequence, locating a corresponding cell in a root block;

(c) retrieving from said cell an identifier of a virtual block comprising one or more nodes;

(d) locating a node in said virtual block corresponding to a next datum in said key data sequence;

(e) retrieving from said node an identifier of a next block, wherein said next block is one of another virtual block and a leaf;

(f) repeating (d)–(f) until said next block is a leaf; and (g) if said node from which said identifier of said leaf was retrieved corresponds to the last datum in said key data sequence, retrieving said target data sequence from said leaf.

21. A computer readable storage medium containing a data structure configured to facilitate the retrieval of a target data sequence related to a key data sequence, the data structure comprising:

a root comprising one cell for each possible value of a first datum in the key data sequence, including a first cell corresponding to said first datum;

one or more virtual blocks, wherein each said virtual block comprises one or more nodes and each said node is configured to identify one of:

another of said one or more virtual blocks; and a leaf; and one or more leaves containing data sequences, including a first leaf containing the target data sequence;

wherein nodes of one of said virtual blocks are interleaved, in the data structure, with nodes of another of said virtual blocks.

22. The computer readable storage medium of claim 21, wherein each node of a virtual block comprises:

a first reference identifying said virtual block; and a second reference identifying either said other virtual block or said leaf.

23. The computer readable storage medium of claim 21, wherein said first leaf comprises:

a first reference identifying one of said first leaf and a first virtual block;

a size of the target data sequence; and the target data sequence.

24. The computer readable storage medium of claim 21, wherein the key data sequence comprises a plurality of Unicode characters and the target data sequence comprises a composite Unicode character.

25. The computer readable storage medium of claim 24, wherein said first datum comprises a first byte of a first character of said plurality of Unicode characters.

26. An apparatus for determining whether a first target data sequence corresponding to a first key data sequence is available, comprising:

a root block comprising one entry for each possible value of a first datum of said first key data sequence;

a set of virtual blocks, wherein each of said virtual blocks comprises one or more nodes, and each node comprises:

a first reference configured to identify said virtual block comprising said node; and a second reference configured to identify either another virtual block or a leaf; and a set of leaves, wherein each of said leaves is configured to store a target data sequence corresponding to a first key data sequence; and a processor configured to traverse, from a first entry in said root block corresponding to said first datum, nodes within a subset of said virtual blocks corresponding to subsequent data in said first key data sequence, via said second references, to determine whether one of said leaves contains said first target data sequence.

27. The apparatus of claim 26, wherein each of said leaves comprises:
   a size of said target data sequence; and
   said target sequence.

28. The apparatus of claim 27, wherein each of said leaves further comprises:
   a first reference configured to identify either said leaf comprising said first reference or one of said virtual blocks.

29. The apparatus of claim 26, wherein said root block, said set of virtual blocks and said set of leaves are stored contiguously in a memory.

30. The apparatus of claim 29, wherein one or more nodes of a first virtual block are interleaved with one or more nodes of a second virtual block.

* * * * *